(12) United States Patent
Liu

(10) Patent No.: US 12,493,400 B2
(45) Date of Patent: Dec. 9, 2025

(54) DISPLAY METHOD AND ELECTRONIC DEVICE

(71) Applicant: VIVO MOBILE COMMUNICATION CO., LTD., Dongguan (CN)

(72) Inventor: Ang Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 173 days.

(21) Appl. No.: 18/384,356

(22) Filed: Oct. 26, 2023

(65) Prior Publication Data
US 2024/0053874 A1 Feb. 15, 2024

Related U.S. Application Data

(63) Continuation of application No. PCT/CN2022/088125, filed on Apr. 21, 2022.

(30) Foreign Application Priority Data

Apr. 27, 2021 (CN) .......................... 202110459451.1

(51) Int. Cl.
*G06F 3/04845* (2022.01)
*G06F 3/0482* (2013.01)

(52) U.S. Cl.
CPC ........ *G06F 3/04845* (2013.01); *G06F 3/0482* (2013.01)

(58) Field of Classification Search
CPC ............... G06F 3/04845; G06F 3/0482; G06F 3/04883; G06F 2203/04806; G06F 2203/04808; G04G 9/00; G04G 9/0082; G04G 21/00
See application file for complete search history.

(56) References Cited

U.S. PATENT DOCUMENTS

2014/0143678 A1* 5/2014 Mistry ................. G06F 3/0487
715/746

FOREIGN PATENT DOCUMENTS

| CN | 103761120 A | * | 4/2014 | ......... G06F 3/04817 |
|---|---|---|---|---|
| CN | 104375774 A | | 2/2015 | |
| CN | 105607457 A | | 5/2016 | |
| CN | 112416232 A | | 2/2021 | |
| CN | 113190141 A | | 7/2021 | |
| KR | 20010044214 A | | 6/2001 | |

OTHER PUBLICATIONS

First Office Action issued in related Chinese Application No. 202110459451.1, mailed Mar. 22, 2024, 8 pages.
(Continued)

*Primary Examiner* — Cao H Nguyen
(74) *Attorney, Agent, or Firm* — IPX PLLC

(57) ABSTRACT

A display method and an electronic device are provided. The method includes: displaying a time dial. The time dial includes K pointers, the K pointers are used to indicate time, and K is a positive integer. The method further includes receiving a first input performed on a first pointer in the K pointers. The method also includes displaying, in response to the first input, M application icons associated with the first pointer. M is a positive integer. The method additionally includes displaying an application interface corresponding to a target icon in a case that the first pointer indicates the target icon. The M application icons include the target icon.

14 Claims, 12 Drawing Sheets

(56) References Cited

OTHER PUBLICATIONS

Second Office Action issued in related Chinese Application No. 202110459451.1, mailed Sep. 25, 2024, 7 pages.
Extended European Search Report issued in related European Application No. 22794732.2, mailed Sep. 17, 2024, 9 pages.
International Search Report issued in corresponding International Application No. PCT/CN2022/088125, mailed Jun. 29, 2022, 4 pages.

* cited by examiner

DISPLAY METHOD AND ELECTRONIC DEVICE

CROSS-REFERENCE TO RELATED APPLICATIONS

This application is a continuation of International Application No. PCT/CN2022/088125, filed on Apr. 21, 2022, which claims priority to Chinese Patent Application No. 202110459451.1, filed on Apr. 27, 2021. The entire contents of each of the above-referenced applications are expressly incorporated herein by reference.

TECHNICAL FIELD

This application pertains to the field of terminal technologies, and specifically relates to a display method and an electronic device.

BACKGROUND

With the rapid development of electronic technologies, electronic devices such as smart wristbands are widely used, and more and more applications can be installed in the electronic devices.

Currently, display of an application interface in an electronic device is generally triggered by a physical button or an icon control, and is restricted by material quality and a force feedback of the physical button, and scattered distribution of icon controls, resulting a poor etTect of triggering display of the application interface.

SUMMARY

Embodiments of this application aim to provide a display method and an electronic device.

According to a first aspect, an embodiment of this application provides a display method, and the method includes:
  displaying a time dial, where the time dial includes K pointers, the K pointers are used to indicate time, and K is a positive integer;
  receiving a first input performed on a first pointer in the K pointers;
  displaying, in response to the first input, M application icons associated with the first pointer, where M is a positive integer; and
  displaying an application interface corresponding to a target icon in a case that the first pointer indicates the target icon, where the M application icons include the target icon.

According to a second aspect, an embodiment of this application provides a display apparatus, and the apparatus includes:
  a first display module, configured to display a time dial, where the time dial includes K pointers, the K pointers are used to indicate time, and K is a positive integer;
  a receiving module, configured to receive a first input performed on a first pointer in the K pointers;
  a second display module, configured to display, in response to the first input, M application icons associated with the first pointer, where M is a positive integer; and
  a third display module, configured to display an application interface corresponding to a target icon in a case that the first pointer indicates the target icon, where the M application icons include the target icon.

According to a third aspect, an embodiment of this application provides an electronic device. The electronic device includes a processor, a memory, and a program or an instruction that is stored in the memory and that can be run on the processor, where the program or the instruction is executed by the processor to implement the steps of the method in the first aspect.

According to a fourth aspect, an embodiment of this application provides a readable storage medium. The readable storage medium stores a program or an instruction, and the program or the instruction is executed by a processor to implement the steps of the method in the first aspect.

According to a fifth aspect, an embodiment of this application provides a chip. The chip includes a processor and a communication interface, the communication interface is coupled to the processor, and the processor is configured to run a program or an instruction to implement the method in the first aspect.

According to a sixth aspect, an embodiment of this application provides a computer program product. The computer program product is stored in a non-volatile storage medium, and the computer program product is executed by at least one processor to implement the method in the first aspect.

According to a seventh aspect, an electronic device is provided, configured to perform the method in the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a display method provided in the embodiments of this application is described in detail by using specific embodiments and application scenarios.

Figure 1:
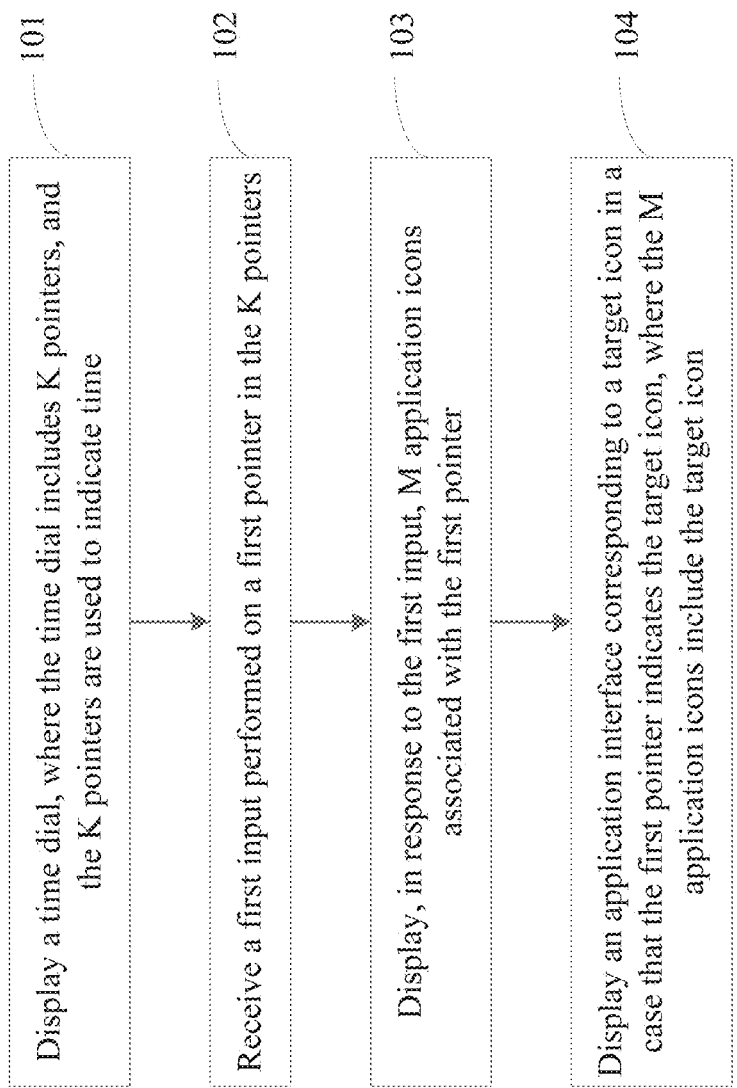
FIG. 1 is a flowchart of a display method according to some embodiments of this application.

FIG. 1 is a flowchart of a display method according to an embodiment of this application. As shown in FIG. 1, the method includes the following steps.

Step 101: Display a time dial, where the time dial includes K pointers, and the K pointers are used to indicate time.

It should be noted that, the display method provided in this embodiment of this application may be performed by a display apparatus or a control module that is in the display apparatus and that is configured to perform the display method.

In this step, the time dial is a general term of elements for indicating time, and may include each element for indicating time, where a pointer is an essential element for indicating time in the time dial, the time dial may include K pointers, and K is a positive integer. In addition to the K pointers, the time dial may include a time scale. This is not specifically limited herein.

The K pointers include at least one of an hour hand, a minute hand, and a second hand. In an implementation, the K pointers include all of the hour hand, the minute hand, and the second hand.

A shape of the time dial may be a circle, a square, or the like. In the following descriptions, for example, the shape of the time dial is a circle.

There may be a plurality of display manners of the time dial. For example, the time dial may be displayed on an interface of the display apparatus by using an installed dial plug-in, or the time dial may be displayed on an interface of the display apparatus by invoking a corresponding program. The interface of the display apparatus may be a main interface, an interface displayed when a screen is locked, or may be another interface. This is not specifically limited herein.

Step 102: Receive a first input performed on a first pointer in the K pointers.

In this step, the K pointers may be a control in a pointer form, that is, the display apparatus may receive an input of a user based on a pointer, and perform a related function based on the input of the user. In addition, the pointer may have a specific pointing function.

A feature of the pointer may include at least one of the following:
being stretched;
being contracted, and
being rotated.

That is, through at least one operation of stretching, contraction, and rotation on a pointer in the K pointers the user may control the display apparatus to perform a related function for the operation.

The first input may be a voice input, a gesture input, a touch input, or the like, and the touch input may include a touch and hold input, a slide input, a drag input, and the like. In the following descriptions, for example, the first input is a touch input.

In an implementation, the first input may include a touch and hold input and a slide input, and the user may press an hour hand for a long time to enable the hour hand to enter a target state. A pointer in the target state may be used as a control in a pointer form, and sliding is performed on the pointer, so that the pointer can be stretched, contracted, or rotated.

Step 103. Display, in response to the first input, M application icons associated with the first pointer.

M is a positive integer.

In this step, the M application icons may be preset application icons, or may be application icons corresponding to the most recently used applications. This is not specifically limited herein. In addition, the preset application icon may be a shortcut function icon, or may be an application icon corresponding to an application.

M may be 1, or may be determined based on a length or a rotation angle of the first pointer. This is not specifically limited herein.

Different first pointers may also be associated with different application icons. For example, for an hour hand, the hour hand may be associated with an application icon corresponding to a most recently used application, where the most recently used application may be an application that was last used by the user at a current time. For a minute hand, the minute hand may be associated an application icon corresponding to an application of a call function, a sports function, and a short message function. For a second hand, the second hand may be associated with an application icon corresponding to an application of breathing training, a physical activity value, heart rate monitoring, sleep monitoring, pressure monitoring, blood oxygen monitoring, music, and weather.

Step 104: Display an application interface corresponding to a target icon in a case that the first pointer indicates the target icon, where the M application icons include the target icon.

In this step, the first pointer has a pointing function, and may indicate an icon by using any one of a pointing location, a length, and a rotation angle of the first pointer.

In a case that the first pointer indicates the target icon, the application interface corresponding to the target icon may be immediately displayed, or the application interface corresponding to the target icon may be displayed after the first pointer is released. This is not specifically limited herein.

Figure 2:
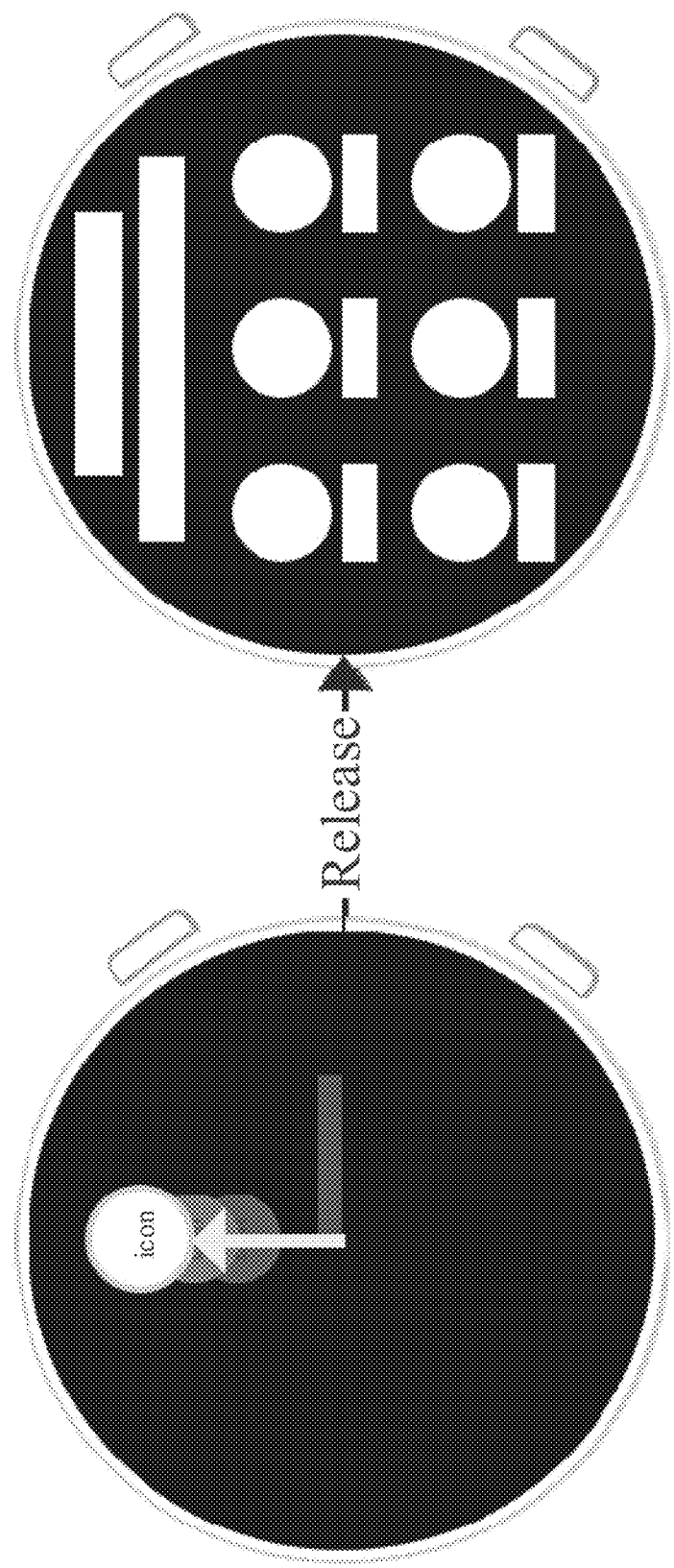
FIG. 2 is a schematic diagram of display of an application interface according to some embodiments of this application.

For example, in a case that it is determined that the first pointer indicates the target icon, an application corresponding to the target icon is started after the first pointer is released, and the application interface corresponding to the target icon is displayed, as shown in FIG. 2.

In this embodiment, a time dial is displayed, where the time dial includes K pointers, and the K pointers are used to indicate time; a first input performed on a first pointer in the K pointers is received; M application icons associated with the first pointer are displayed in response to the first input, where M is a positive integer, and an application interface corresponding to a target icon is displayed in a case that the first pointer indicates the target icon, where the M application icons include the target icon. In this way, the time dial may be displayed, and display of the application interface may be triggered by a pointer on the time dial. The pointer may not be restricted by material quality and a force feedback relative to a physical button, but the pointer may be triggered to display M application icons associated with the pointer relative to an icon control. Therefore, the application interface that needs to be displayed is selected, and the pointer may not be restricted by scattered distribution of icon controls, thereby improving an effect of triggering display of the application interface.

In addition, a specific feature design may be performed by using a product feature of the display apparatus, to improve a use value of a pointer.

In some embodiments, step 103 includes:
adjusting a display state of the first pointer to a first display state in response to the first input; and
displaying the M application icons associated with the first display state.

In this implementation, the display state of the first pointer is a display state of the first pointer on an interface of the display apparatus. In a case that the display state of the first pointer is an initial state, the first pointer in the initial state is used to display time, and the first pointer is touched and held, so that the display state of the first pointer can change.

For example, the hour hand, the minute hand, or the second hand may be touched and held to enable the hour hand, the minute hand, or the second hand to be in a target state, where the target state includes at least one of a stretching state, a contraction state, and a rotating state. In some embodiments, when the hour hand is touched and held, the hour hand is in a stretching state, and other content may be dimmed, as shown in FIG. 3 and FIG. 4.

Figure 3:
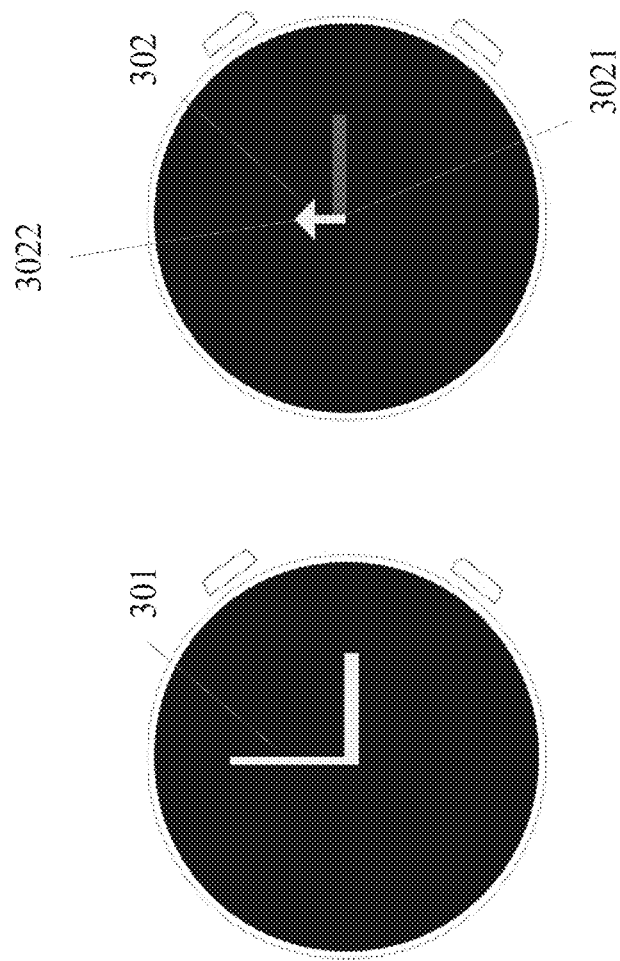
FIG. 3 is a first schematic diagram of display in a target state of a first pointer according to some embodiments of this application.
Figure 4:
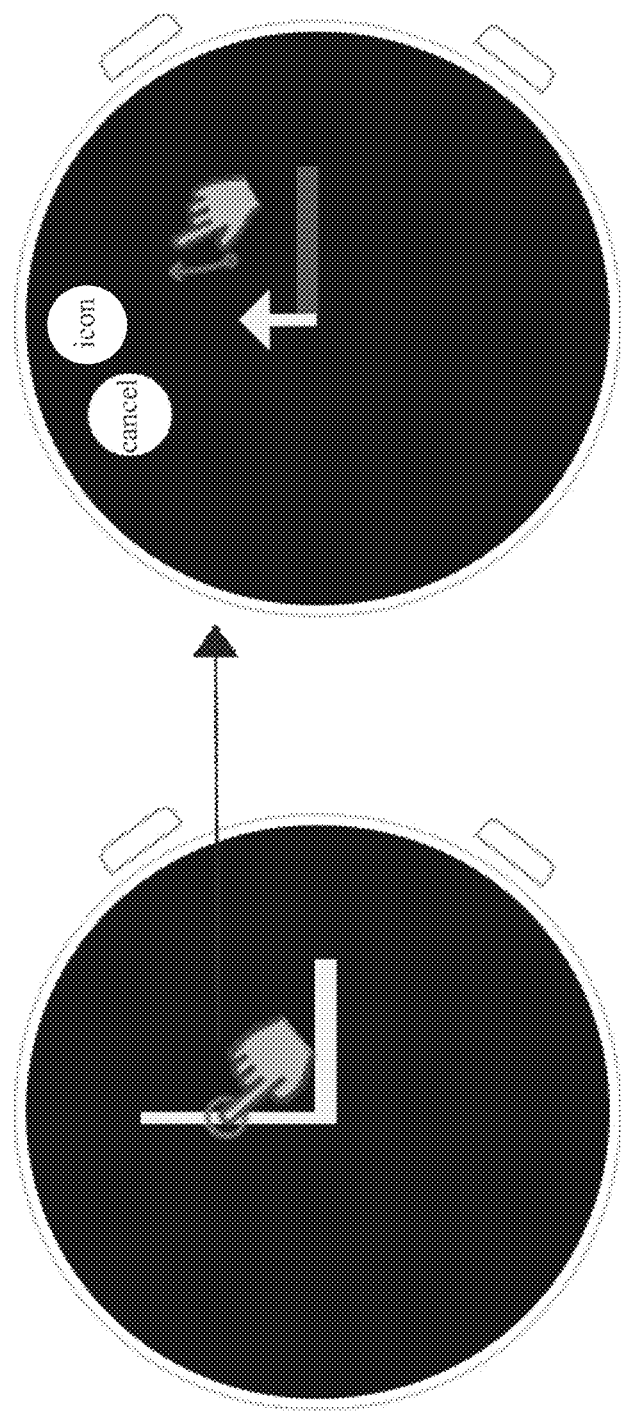
FIG. 4 is a second schematic diagram of display in a target state of a first pointer according to some embodiments of this application.

As shown in FIG. 3, after an hour hand 301 is touched and held, a display state of the hour hand may be changed, and a pointer in the display state may be a control 302 in a pointer form. In addition, a manner of triggering a minute hand and a second hand is similar to a manner of triggering an hour hand to display a control in a pointer form, and details are not described herein again. The pointer in the display state may include two endpoints, where one endpoint is a fixed end 3021, the other endpoint is a pointing end 3022, and a length from the fixed end to the pointing end is a length of the pointer. After the hour hand 301 is touched and held, the length of the first pointer may be a preset minimum value, which may be stretched on this basis, or may be a preset maximum value, which may be contracted on this basis. This is not specifically limited herein.

The user may control the first pointer to stretch or contract the length from the fixed end to the pointing end based on the fixed end, or may control the first pointer to rotate based on a length.

In a case of displaying the control in a pointer form, the user may perform an operation such as stretching, contraction, or rotation on the first pointer. Correspondingly, the display apparatus may adjust the display state of the first pointer to the first display state, where the first display state matches an input parameter of the first input.

For example, the first display state of the first pointer is the length of the first pointer, and the input parameter of the first input is stretching by 5 mm. Before stretching, the length of the first pointer is 5 mm. Correspondingly, the display state of the first pointer is adjusted to increase a stretched length. In this case, the length of the first pointer is 1 cm.

Then, the M application icons associated with the first display state may be displayed, where the M application icons displayed in different first display states may be different. Therefore, different application icons may be displayed by using different display states of the first pointer. In this way, an application interface corresponding to an application icon that needs to be displayed is selected, thereby improving an effect of triggering display of the application interface.

In some embodiments, the first display state of the first pointer includes at least one of the following:
a pointing location of the first pointer is a target location;
a length of the first pointer is a target length; and
a rotation angle of the first pointer is a target angle.

In this implementation, when the first display state is the target length, M application icons that are in a one-to-one correspondence with the most recently used M applications may be displayed, or preset M application icons may be displayed, where M may be determined based on the target length, and M is greater than 1; or only an application icon corresponding to one recently used application may be displayed, or only one preset application icon may be displayed, where the application icon may be determined based on the target length.

When the first display state is the target angle, M application icons that are in a one-to-one correspondence with the most recently used M applications may be displayed, or preset M application icons may be displayed, where M may be determined based on the target angle, and M is greater than 1; or only an application icon corresponding to one recently used application may be displayed, or only one preset application icon may be displayed, where the application icon may be determined based on the target angle.

It should be noted that, in a case that M is greater than 1, a display manner of the M application icons may be overlapping display. For example, the M application icons are displayed in a pointing direction of the first pointer in an overlapping manner, or may be displayed at intervals on the time dial such as an edge of the time dial. This is not specifically limited herein.

When the pointing location of the first pointer is the target location, the M application icons may be displayed in the pointing direction of the first pointer in an overlapping manner, and the target location may point to an application icon displayed at the top. In addition, M may be determined based on the target length and/or the target angle.

For example, for an hour hand, the hour hand may be associated with an application icon corresponding to the most recently used application, and a quantity of application icons may be set according to an actual situation. For example, 8 or 15 application icons may be set. A length of the pointer may be equally divided based on a maximum length of the pointer, where a quantity for equal division may be equal to a quantity of application icons, and each length corresponds to display of one application icon; or a rotation angle of the pointer may be equally divided based on a maximum rotation angle of the pointer, where a quantity for equal division may be equal to a quantity of application icons, and each rotation angle corresponds to display of one application icon.

Then, application icons corresponding to the most recently used applications may be successively displayed based on the target length or the target angle. If the target length is shorter or the target angle is smaller, an application icon of an application that is used closer to the current time is displayed, and if the target length is longer or the target angle is larger, an application icon of an application that is used farther away from the current time is displayed.

For another example, for a minute hand, the minute hand may be associated with a preset application icon, and a quantity of application icons may also be set according to an actual situation. For example, three application icons may be set. A length of the pointer may be equally divided based on a maximum length of the pointer, where a quantity for equal division may be equal to a quantity of application icons, and each length corresponds to display of one application icon.

Then, preset application icons may be successively displayed based on the target length. For example, application icons corresponding to applications of a call function, a sports function, and a short message function are successively displayed in ascending order of lengths based on the target length.

For another example, for a second hand, the second hand may be associated with a preset application icon, and a quantity of application icons may also be set according to an actual situation. For example, eight application icons may be set. A length of the pointer may be equally divided based on a maximum length of the pointer, where a quantity for equal division may be equal to a quantity of application icons, and each length corresponds to display of one application icon.

Then, preset application icons may be successively displayed based on the target length. For example, application icons corresponding to applications of breathing training, a physical activity value, heart rate monitoring, sleep monitoring, pressure monitoring, blood oxygen monitoring, music, and weather are successively displayed in ascending order of lengths based on the target length.

M may be a positive integer, and may be 1, and only one application icon corresponding to the target length may be displayed. M may be greater than 1, and an application icon corresponding to each length of the pointer may be displayed in a stretching process. In some embodiments, a value of M may be determined by determining a quantity for equal length division corresponding to the target length. For example, a maximum length of the pointer is 4 cm and is divided into 8 equal parts in advance, each of which is 5 mm. When the target length is 3.3 cm, it may be determined that the quantity for equal length division corresponding to the target length is 7, that is, M is 7.

For example, in a stretching process, an application icon A corresponding to the length may be displayed based on the length of the first pointer. When the length of the first pointer exceeds a length corresponding to the application icon A, the application icon A is hidden, and an application icon B corresponding to a current length is displayed.

For another example, in a stretching process, when the length of the first pointer exceeds a length corresponding to a currently displayed application icon, a previously displayed application icon may be displayed through gradient fading-out, or application icon may be successively displayed in ascending order of sizes, that is, an application icon corresponding to each length of the first pointer is displayed in the stretching process.

Figure 5:
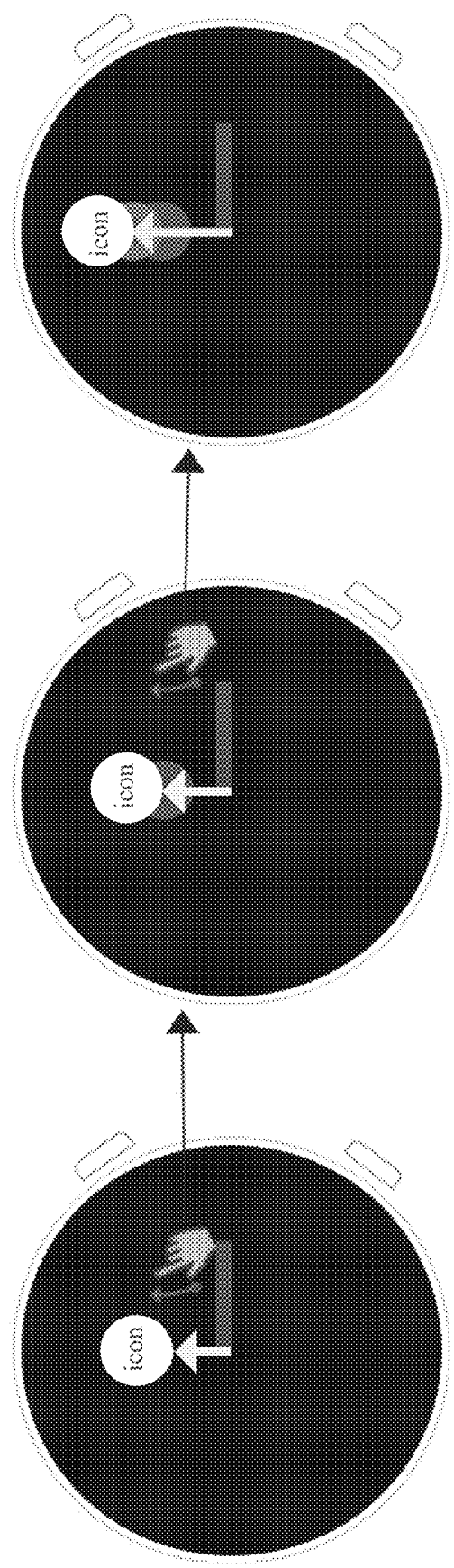
FIG. 5 is a first display manner of M application icons according to some embodiments of this application.

As shown in FIG. 5, as the first pointer is stretched, application icons corresponding to the lengths of the first pointer are successively displayed through gradient fading-out. An application icon corresponding to the target length of the first pointer is displayed at the top, and an application icon corresponding to the first length of the first pointer is displayed at the bottom.

Figure 6:
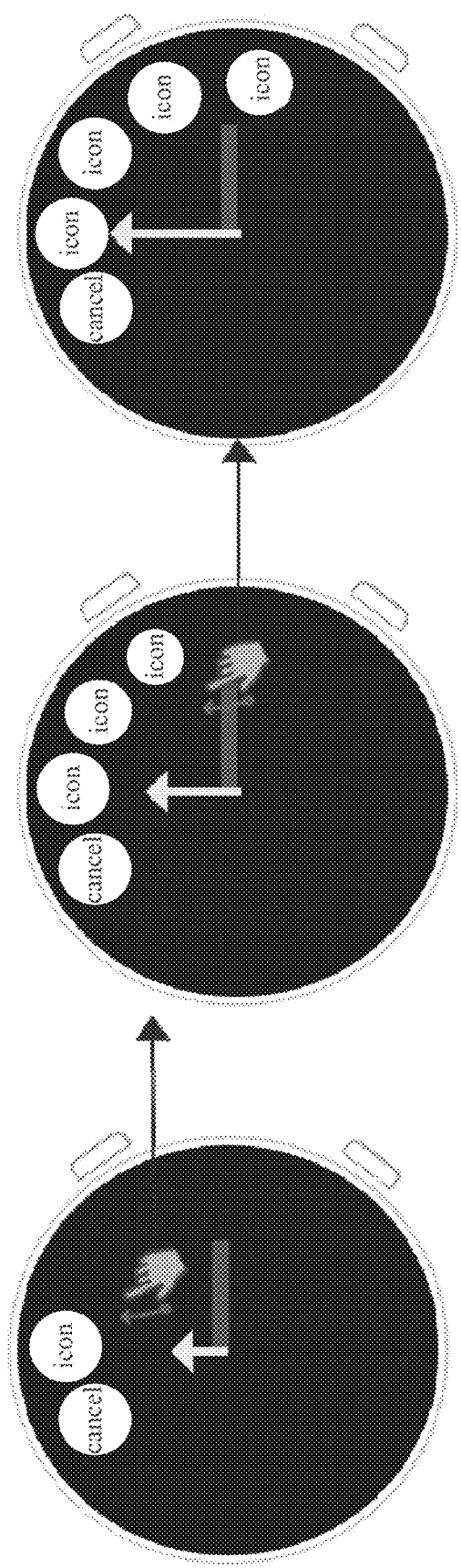
FIG. 6 is a second display manner of M application icons according to some embodiments of this application.

As shown in FIG. 6, as the first pointer is stretched, application icons corresponding to the lengths of the first pointer are successively displayed in ascending order of sizes until a display length corresponding to the application icon is exceeded. In this case, a size of the application icon does not change. The successively displayed application icons may be displayed in a clockwise direction at an edge of the time dial, and the displayed application icons may not be overlapped with each other.

In this implementation, the display state of the first pointer is set to include at least one of the pointing location, the length, and the rotation angle. In this way, a type of the first display state can be more diversified, thereby improving flexibility of displaying an application icon.

In some embodiments, the first display state is the target length or the target angle, and the method further includes:
in a case that the first display state is the target length, the M application icons are any one of the following;
application icons corresponding to the first M applications arranged in ascending order of intervals from a current time in the most recently used applications, where M is determined based on the target length; and
an application icon corresponding to an N application arranged in ascending order of intervals from a current time in the most recently used applications, where N is determined based on the target length; and
in a case that the first display state is the target angle, the M application icons are any one of the following:
application icons corresponding to the first M applications arranged in ascending order of intervals from a current time in the most recently used applications, where M is determined based on the target angle, and
an application icon corresponding to an $N^{th}$ application arranged in ascending order of intervals from a current time in the most recently used applications, where N is determined based on the target angle.

In this implementation, the M application icons include application icons corresponding to the most recently used applications. Application icons corresponding to the most recently used applications may be successively displayed based on the target length. In a stretching process, if the target length is shorter, an application icon of an application that is used closer to the current time is displayed, and if the target length is longer, an application icon of an application that is used farther away from the current time is displayed.

Correspondingly, when the application icons corresponding to the most recently used applications are being displayed, the application icons corresponding to each length in the target length may be displayed, that is, the application icons corresponding to the first M applications arranged in ascending order of intervals from the current time in the most recently used applications are displayed, where M is determined based on the target length, and may be a quantity for equal length division corresponding to the target length.

Application icons corresponding to the most recently used applications may be successively displayed based on the target angle. If the target angle is smaller, an application icon of an application that is used closer to the current time is displayed, and if the target angle is larger, an application icon of an application that is used farther away from the current time is displayed.

Correspondingly, when the application icons corresponding to the most recently used applications are being displayed, the application icons corresponding to each angle in the target angle may be displayed, that is, the application icons corresponding to the first M applications arranged in ascending order of intervals from the current time in the most recently used applications are displayed, where M is determined based on the target angle, and may be a quantity for equal angle division corresponding to the target angle.

When M is equal to 1, an application icon corresponding to the target length may also be displayed, that is, the application icon corresponding to the $N^{th}$ application arranged in ascending order of intervals from the current time in the most recently used applications are displayed, where N is determined based on the target length, and is a quantity for equal length division corresponding to the target length.

An application icon corresponding to the target angle may be displayed, that is, the application icon corresponding to the $N^{th}$ application arranged in ascending order of intervals from the current time in the most recently used applications are displayed, where N is determined based on the target angle, and is a quantity for equal angle division corresponding to the target angle.

In this implementation, the target length or the target angle of the first pointer is associated with an application icon corresponding to the most recently used application. In a stretching process, if the target length is shorter or the target angle is smaller, an application icon of an application that is used closer to the current time is displayed, and if the target length is longer or the target angle is larger, an application icon of an application that is used farther away from the current time is displayed. In this way, the user may choose, by stretching or rotating the first pointer, to start applications corresponding to different application icons based on a stretching length or a rotation angle, and display a corresponding application interface, thereby improving a startup effect of entering the most recently used application and improving user experience and interest of entering the most recently used application.

In some embodiments, step 104 includes:
displaying the application interface corresponding to the target icon in a case that a pointing location of the first pointer points to the target icon;
or
displaying the application interface corresponding to the target icon in a case that a rotation angle of the first pointer corresponds to the target icon;
or
displaying the application interface corresponding to the target icon in a case that a length of the first pointer corresponds to the target icon.

Figure 7:
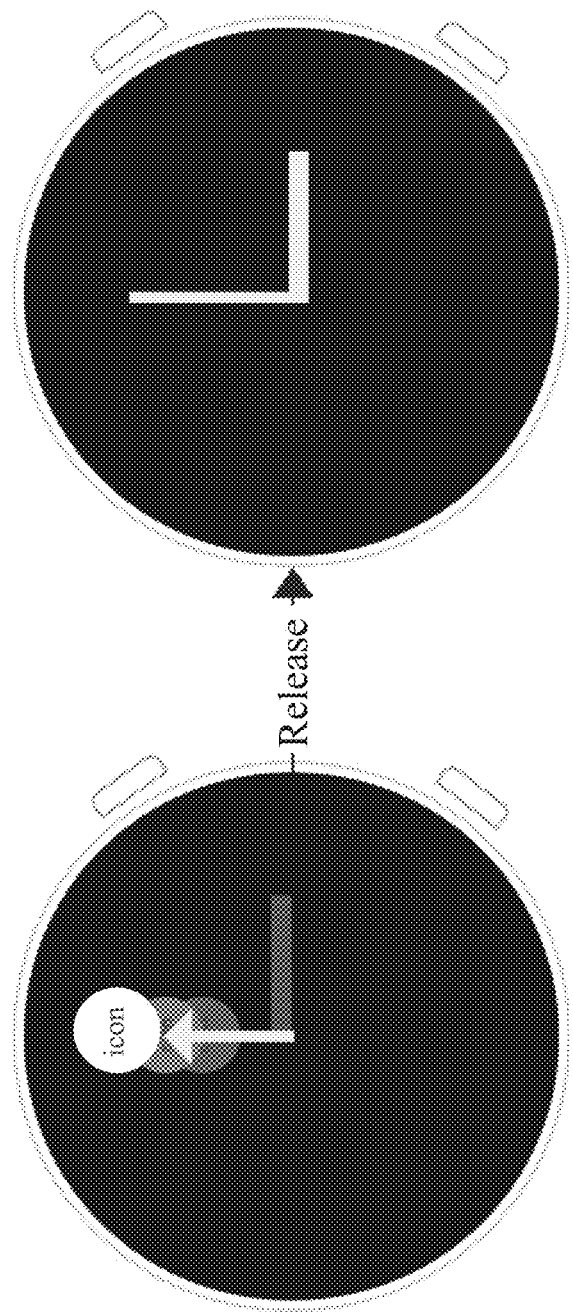
FIG. 7 is a first schematic diagram of recovery of a first pointer according to some embodiments of this application.
Figure 8:
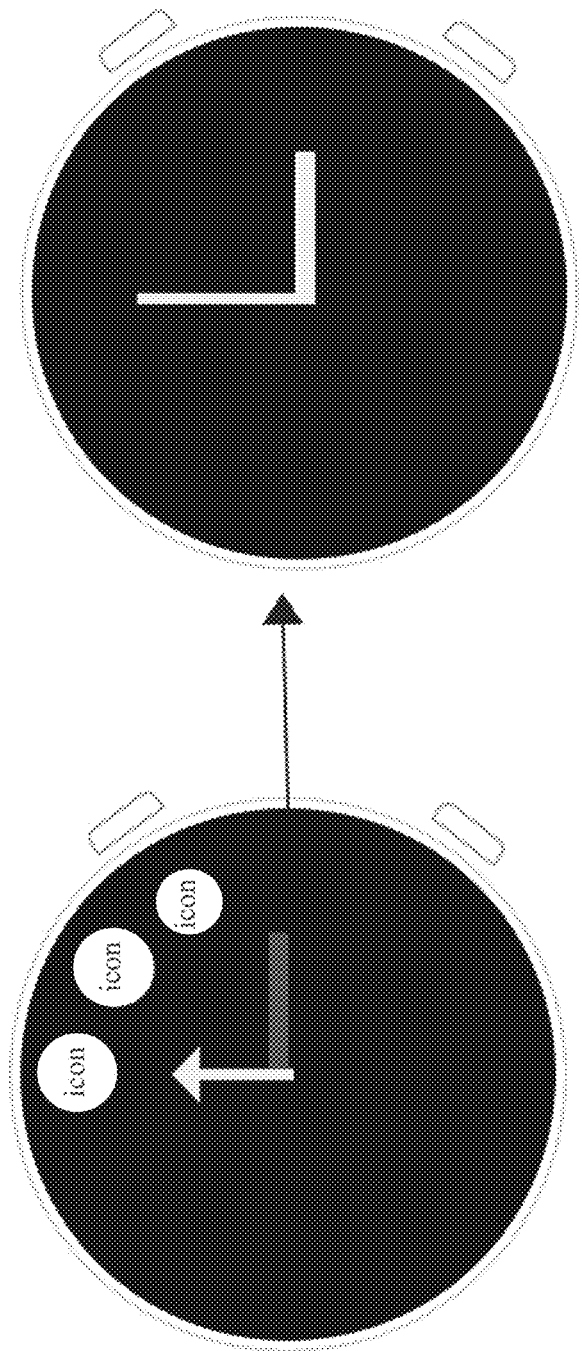
FIG. 8 is a second schematic diagram of recovery of a first pointer according to some embodiments of this application.

In this implementation, in a case that the M application icons are displayed, it may be determined whether the first pointer indicates the target icon. In a case that it is determined that the first pointer indicates the target icon, the application interface corresponding to the target icon is displayed. In a case that it is determined that the first pointer does not indicate the target icon, when a finger of the user touching the first pointer is released, the first pointer may be restored to an initial state, and the first pointer in the initial state is used to indicate time, as shown in FIG. 7 and FIG. 8.

Whether the first pointer indicates the target icon may be determined by using any one of the pointing location, the rotation angle, and the length of the first pointer.

In an implementation, in a case that the pointing location of the first pointer points to the target icon, when the finger of the user touching the first pointer is released, the application interface corresponding to the target icon may be displayed, as shown in FIG. 2. The pointing location of the first pointer may point to one or more application icons. This is not specifically limited herein.

In another implementation, in a case that the length of the first pointer corresponds to the target icon, when the finger of the user touching the first pointer is released, the application interface corresponding to the target icon may be displayed.

In still another implementation, in a case that the rotation angle of the first pointer corresponds to the target icon, when the finger of the user touching the first pointer is released, the application interface corresponding to the target icon may be displayed. Correspondingly, before the displaying the application interface corresponding to the target icon in a case that a rotation angle of the first pointer corresponds to the target icon, the method further includes:
obtaining the rotation angle of the first pointer: and
determining, based on the rotation angle, the target icon indicated by the first pointer.

Figure 9:
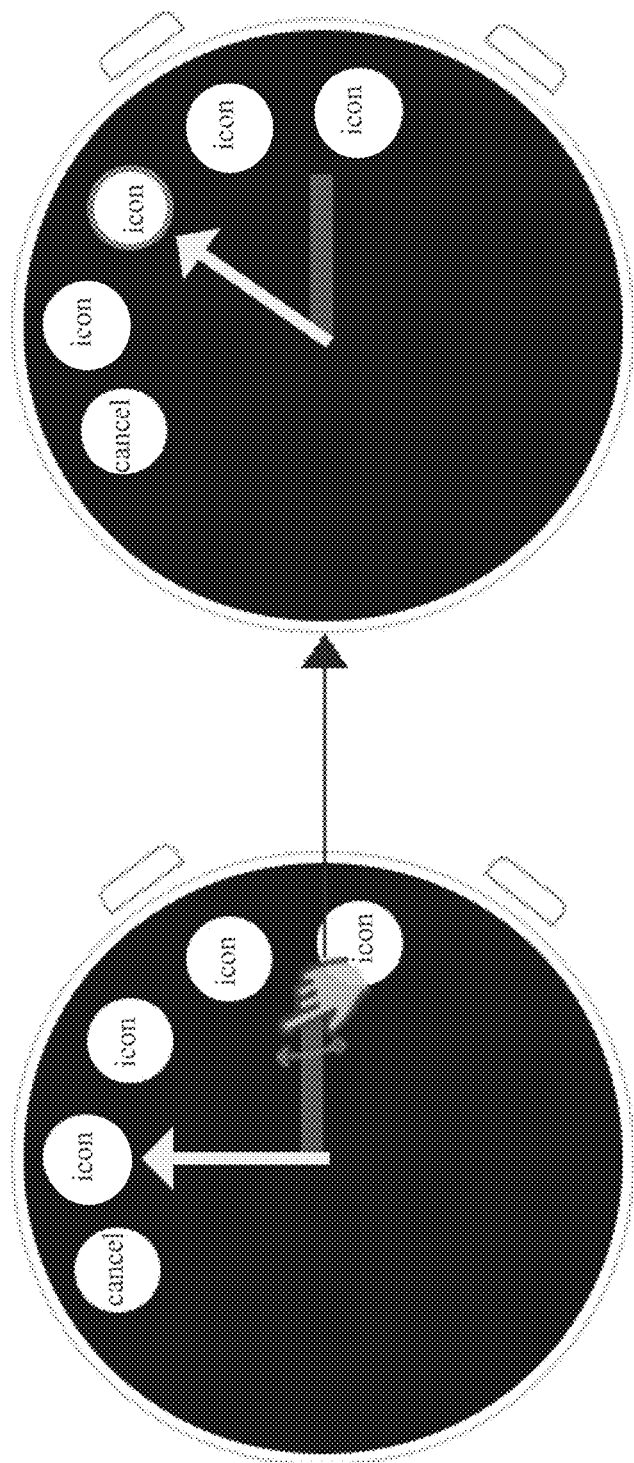
FIG. 9 is a schematic diagram of selecting an application icon by rotating a first pointer according to some embodiments of this application.

As shown in FIG. 9, a display manner of the M application icons is being displayed at intervals at an edge of the time dial. In this case, the first pointer may be rotated to adjust the display state of the first pointer to a second display state, where the second display state may be used to indicate the target icon, so that the rotation angle of the first pointer corresponds to an application icon to be started, that is, the target icon. Correspondingly, the target icon is in a selected state, that is, the first pointer indicates the target icon.

In some alternative embodiments, the first pointer may not be rotated. In a case that the length of the first pointer is greater than or equal to a preset length, the rotation angle of the first pointer may also correspond to the target icon, and the target icon may be the earliest displayed application icon, as shown in FIG. 6. The preset length may be a maximum length that the first pointer is stretched to, or may be a length of the first pointer when a quantity for equal length division is a specific quantity. For example, when the quantity for equal length division is 4, that is, at least four application icons are displayed, the rotation angle of the first pointer may be corresponding to the target icon.

The following describes an example in which the preset length is a maximum length that the first pointer is stretched to.

In some embodiments, when the first pointer is not stretched to a maximum length, the first pointer cannot be rotated, and the first pointer is released, so that the display state of the first pointer is restored to the initial state, as shown in FIG. 8. When the first pointer is stretched to a maximum length, the first pointer may be rotated, and a rotation manner of the first pointer may be non-infinite rotation. During rotation, a width of an application icon may be used as an interval, and a specific application icon corresponding to the rotation angle of the first pointer is temporarily selected.

When the first pointer is stretched to a maximum length, and the first input does not instruct to rotate the first pointer, an initial default rotation angle of the first pointer is 0, and the earliest displayed application icon in the M application icons is correspondingly selected. When the first input instructs to rotate the first pointer, the rotation angle of the first pointer is correspondingly obtained, and the target icon is determined based on the rotation angle.

In addition, after the receiving a first input performed on a first pointer in the K pointers, the method further includes:
displaying a preset icon; and
in a case that the first pointer indicates the preset icon, adjusting a display state of the first pointer to an initial state, where the first pointer in the initial state is used to indicate time.

Figure 10:
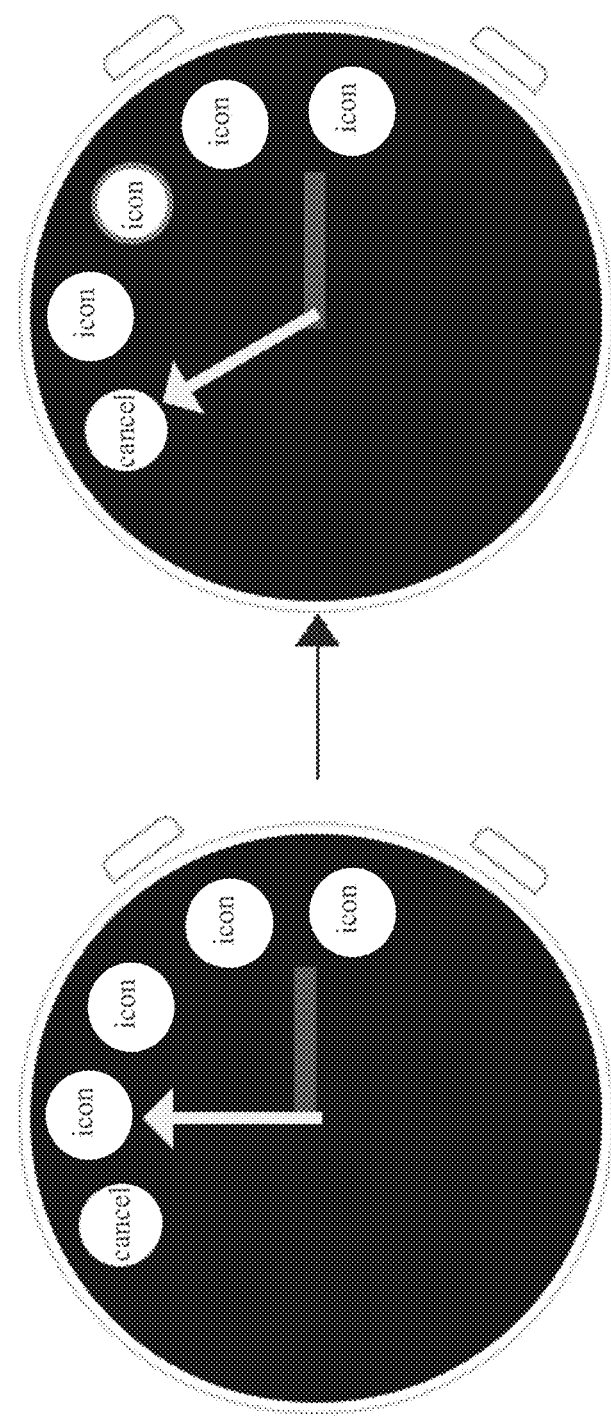
FIG. 10 is a third schematic diagram of recovery of a first pointer according to some embodiments of this application.

The preset icon may be a "cancel" icon. As shown in FIG. 10, when the first pointer is stretched to a maximum length, the first pointer is rotated, so that the rotation angle of the first pointer corresponds to the "cancel" icon. In this case, the first pointer is released, and the display state of the first pointer may be restored to the initial state.

In this implementation, in a case that the M application icons are displayed, the first pointer may indicate the target icon in different manners, and in a case that the first pointer indicates the target icon, the application interface corresponding to the target icon is displayed. In this way, flexibility of indicating an icon by the first pointer can be improved, thereby improving an effect of triggering display of the application interface.

In some embodiments, M is greater than 1, and before the displaying the application interface corresponding to the target icon in a case that a pointing location of the first pointer points to the target icon, the method further includes:

in a case that a pointing direction of the first pointer displays a plurality of application icons in the M application icons, determining that an application icon displayed at the top in the pointing direction of the first pointer is the target icon pointed to by the pointing location of the first pointer.

In a case that the pointing direction of the first pointer displays a plurality of application icons in the M application icons, that is, when the plurality of application icons in the M application icons are displayed in the pointing direction of the first pointer in an overlapping manner, it may be detected whether display duration of the application icon displayed at the top in the pointing direction of the first pointer is greater than a preset threshold. In a case that it is detected that the display duration of the application icon displayed at the top in the M application icons is greater than the preset threshold, that is, the user no longer stretches the first pointer within a display time of the application icon displayed at the top. In this case, when it is detected that the display duration is greater than the preset threshold, it is determined that the application icon displayed at the top is in a selected state, that is, it is determined that the application icon displayed at the top in the pointing direction of the first pointer is the target icon pointed to by the pointing location of the first pointer.

The preset threshold may be set according to an actual situation. For example, the preset threshold is set to 1 s. When the application icon displayed at the top reaches 1 s, the suspended application icon may be slightly magnified and displayed in a selected state. As shown in FIG. 2, in this case, an application corresponding to the application icon in the selected state may be entered after the hand is released, and a corresponding application interface is displayed.

In this implementation, in a case that the pointing direction of the first pointer displays a plurality of application icons in the M application icons, it is determined that the application icon displayed at the top in the pointing direction of the first pointer is the target icon pointed to by the pointing location of the first pointer, the application corresponding to the target icon may be started after the hand is released, and the corresponding application interface is displayed. In this way, the application can be conveniently started by using the first pointer, and the corresponding application interface is displayed.

In some embodiments, before the displaying the application interface corresponding to the target icon in a case that a rotation angle of the first pointer corresponds to the target icon, the method further includes:

in a case that the first input does not instruct to rotate the first pointer, obtaining the rotation angle of the first pointer in a first display state, where the first display state is a display state associated with the M application icons;

or in a case that K is greater than 1, obtaining the rotation angle of the first pointer relative to a second pointer in the K pointers;

or in a case that the first input instructs to rotate the first pointer, obtaining the rotation angle of the first pointer relative to an initial location, where the initial location is a location of the first pointer before the first input is received.

In this implementation, in a case that the first input does not instruct to rotate the first pointer, the rotation angle of the first pointer in the first display state may be obtained. The rotation angle may be 0 by default, and the earliest displayed application icon in the M application icons may be correspondingly selected.

In a case that the first input instructs to rotate the first pointer, the rotation angle of the first pointer relative to the initial location may be obtained, where the initial location is a location of the first pointer before the first input is received. In a case that the rotation angle corresponds to the target icon, the application interface corresponding to the target icon may be displayed.

In addition, in a case that K is greater than 1, the rotation angle of the first pointer relative to the second pointer in the K pointers may also be obtained. For example, if the first pointer is an hour hand and the second pointer is a minute hand, a rotation angle of the hour hand relative to the minute hand may be obtained. In a case that the rotation angle corresponds to the target icon, the application interface corresponding to the target icon may be displayed.

In this implementation, the rotation angle of the first pointer may be obtained in different manners, to select a to-be-selected application icon to start an application, and display a corresponding application interface. In this way, the rotation angle of the first pointer can be used to flexibly select an application icon to start an application, and display a corresponding application interface.

It should be noted that the display method provided in the embodiments of this application may be performed by a display apparatus, or a control module that is in the display apparatus and that is configured to perform the display method. In the embodiments of this application, an example in which the display apparatus performs the display method is used to describe the display apparatus provided in the embodiments of this application.

Figure 11:
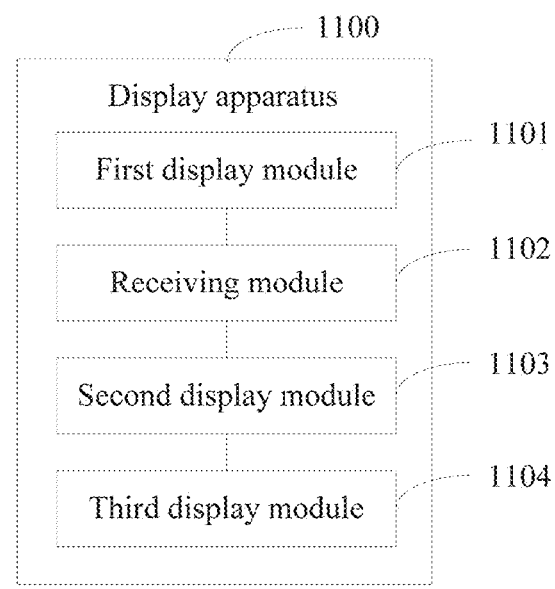
FIG. 11 is a structural diagram of a display apparatus according to some embodiments of this application.

Referring to FIG. 11, FIG. 11 is a structural diagram of a display apparatus according to an embodiment of this application. As shown in FIG. 11, a display apparatus 1100 includes.

a first display module 1101, configured to display a time dial, where the time dial includes K pointers, the K pointers are used to indicate time, and K is a positive integer;

a receiving module 1102, configured to receive a first input performed on a first pointer in the K pointers;

a second display module 1103, configured to display, in response to the first input, M application icons associated with the first pointer, where M is a positive integer; and a third display module 1104, configured to display an application interface corresponding to a target icon in a case that the first pointer indicates the target icon, where the M application icons include the target icon.

In some embodiments, the second display module 1103 includes:
- an adjustment unit, configured to adjust a display state of the first pointer to a first display state in response to the first input, and
- a display unit, configured to display the M application icons associated with the first display state.

In some embodiments, the first display state of the first pointer includes at least one of the following.
- a pointing location of the first pointer is a target location;
- a length of the first pointer is a target length; and
- a rotation angle of the first pointer is a target angle.

In some embodiments, the first display state is the target length or the target angle, and the apparatus further includes:
- in a case that the first display state is the target length, the M application icons are any one of the following.
- application icons corresponding to the first M applications arranged in ascending order of intervals from a current time in the most recently used applications, where M is determined based on the target length, and
- an application icon corresponding to an $N^{th}$ application arranged in ascending order of intervals from a current time in the most recently used applications, where N is determined based on the target length; and
- in a case that the first display state is the target angle, the M application icons are any one of the following:
- application icons corresponding to the first M applications arranged in ascending order of intervals from a current time in the most recently used applications, where M is determined based on the target angle; and
- an application icon corresponding to an $N^{th}$ application arranged in ascending order of intervals from a current time in the most recently used applications, where N is determined based on the target angle.

In some embodiments, the third display module 1104 includes:
- a first display unit, configured to display the application interface corresponding to the target icon in a case that a pointing location of the first pointer points to the target icon;
- a second display unit, configured to display the application interface corresponding to the target icon in a case that a rotation angle of the first pointer corresponds to the target icon, and
- a third display unit, configured to display the application interface corresponding to the target icon in a case that a length of the first pointer corresponds to the target icon.

In some embodiments, M is greater than 1, and the apparatus further includes:
- a determining module, configured to: in a case that a pointing direction of the first pointer displays a plurality of application icons in the M application icons, determine that an application icon displayed at the top in the pointing direction of the first pointer is the target icon pointed to by the pointing location of the first pointer.

In some embodiments, the apparatus further includes:
- a first obtaining module, configured to: in a case that the first input does not instruct to rotate the first pointer, obtain the rotation angle of the first pointer in a first display state, where the first display state is a display state associated with the M application icons;
- a second obtaining module, configured to: n a case that K is greater than 1, obtain the rotation angle of the first pointer relative to a second pointer in the K pointers; and
- a third obtaining module, configured to: in a case that the first input instructs to rotate the first pointer, obtain the rotation angle of the first pointer relative to an initial location, where the initial location is a location of the first pointer before the first input is received.

In this embodiment, the first display module 1101 displays a time dial, where the time dial includes K pointers, and the K pointers are used to indicate time, the receiving module 1102 receives a first input performed on a first pointer in the K pointers; the second display module 1103 displays, in response to the first input, M application icons associated with the first pointer, where M is a positive integer; and the third display module 1104 displays an application interface corresponding to a target icon in a case that the first pointer indicates the target icon, where the M application icons include the target icon. In this way, the time dial may be displayed, and display of the application interface may be triggered by a pointer on the time dial. The pointer may not be restricted by material quality and a force feedback relative to a physical button, but the pointer may be triggered to display M application icons associated with the pointer relative to an icon control. Therefore, the application interface that needs to be displayed is selected, and the pointer may not be restricted by scattered distribution of icon controls, thereby improving an effect of triggering display of the application interface.

The display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a Personal Computer (PC), a Television (TV), an automated teller machine, or a self-service machine. This is not specifically limited in this embodiment of this application.

The display apparatus in this embodiment of this application may be an apparatus with an operating system. The operating system may be an Android operating system, an iOS operating system, or another possible operating system. This is not specifically limited in this embodiment of this application.

The display apparatus provided in this embodiment of this application can implement the processes implemented in the method embodiments in FIG. 1 to FIG. 10. To avoid repetition, details are not described herein again.

Figure 12:
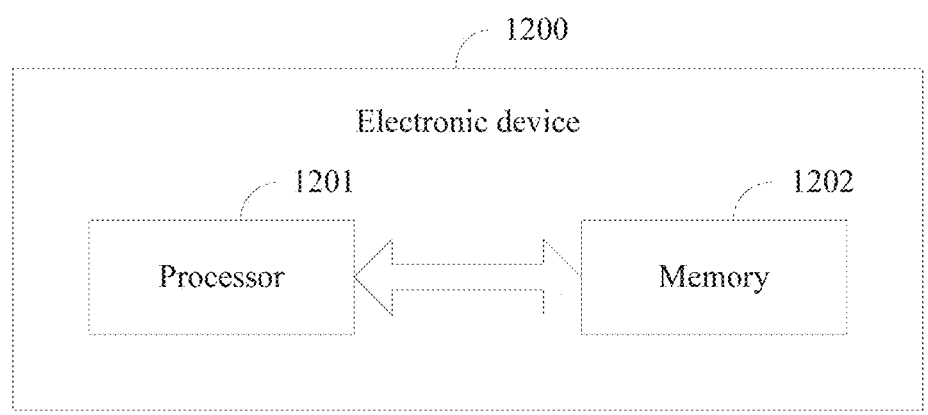
FIG. 12 is a structural diagram of an electronic device according to some embodiments of this application.

For example, as shown in FIG. 12, an embodiment of this application further provides an electronic device 1200, including a processor 1201, a memory 1202, and a program or an instruction that is stored in the memory 1202 and that can be run on the processor 1201, where the program or the instruction is executed by the processor 1201 to implement the processes of the foregoing display method embodiment and a same technical effect can be achieved. To avoid repetition, details are not described herein again.

It should be noted that the electronic device in this embodiment of this application includes the foregoing mobile electronic device and the foregoing non-mobile electronic device.

Figure 13:
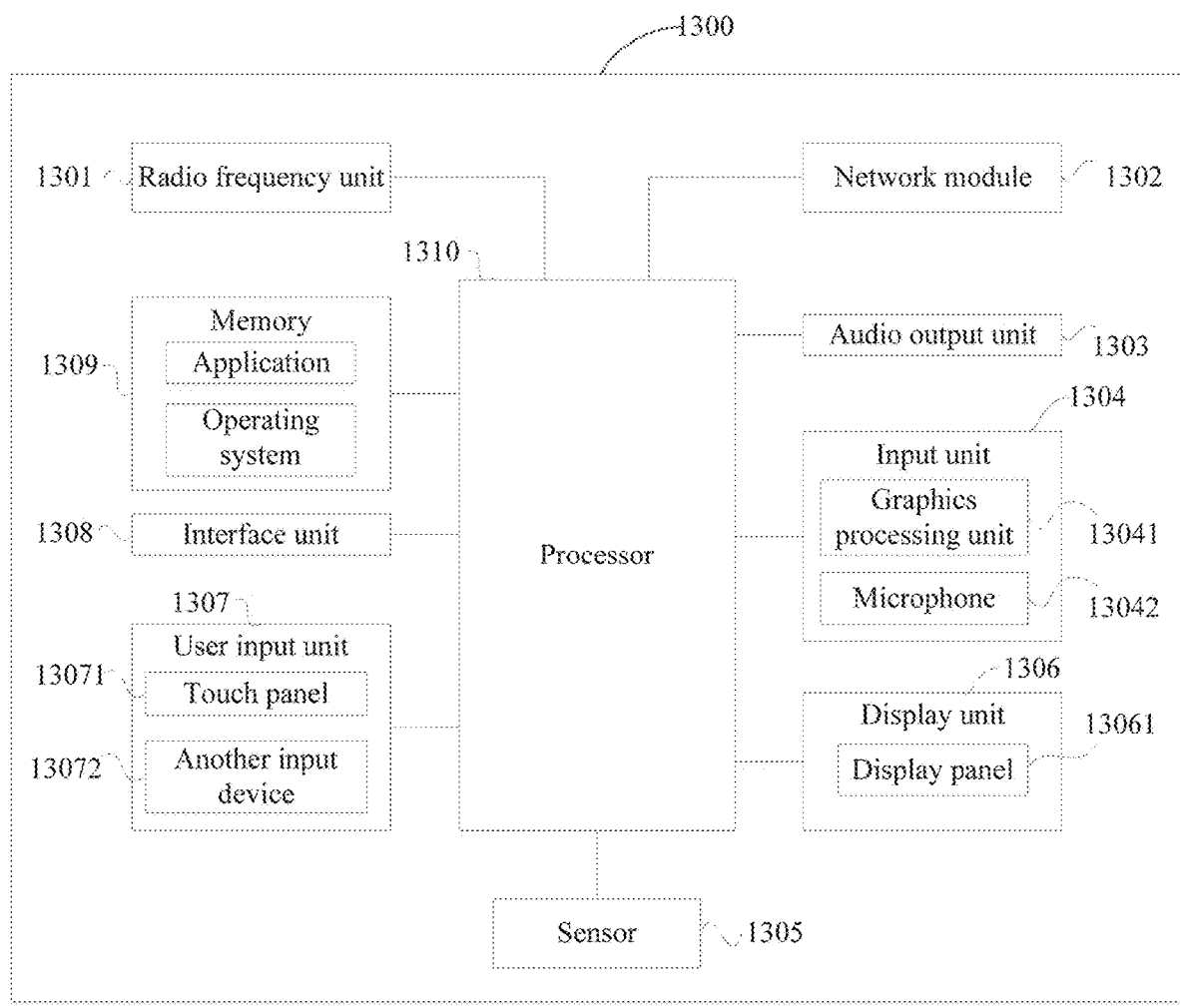
FIG. 13 is a schematic structural diagram of hardware of an electronic device according to some embodiments of this application.

FIG. 13 is a schematic structural diagram of hardware of an electronic device according to an embodiment of this application.

An electronic device 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art can understand that the electronic device 1300 may further include a power supply (such as a battery) that supplies power to each component. The power supply may be logically connected to the processor 1310 by using a power supply management system, to implement functions such as charging and discharging management, and power consumption management by using the power supply management system. The structure of the electronic device shown in FIG. 13 does not constitute a limitation on the electronic device. The electronic device may include components more or fewer than those shown in the diagram, a combination of some components, or different component arrangements. Details are not described herein.

The display unit 1306 is configured to display a time dial, where the time dial includes K pointers, the K pointers are used to indicate time, and K is a positive integer.

The input unit 1304 is configured to receive a first input performed on a first pointer in the K pointers.

The display unit 1306 is further configured to display, in response to the first input, M application icons associated with the first pointer, where M is a positive integer.

The display unit 1306 is further configured to display an application interface corresponding to a target icon in a case that the first pointer indicates the target icon, where the M application icons include the target icon.

In this embodiment, the display unit 1306 displays a time dial, where the time dial includes K pointers, and the K pointers are used to indicate time; the input unit 1304 receives a first input performed on a first pointer in the K pointers; and the display unit 1306 displays, in response to the first input, M application icons associated with the first pointer, where M is a positive integer; and displays an application interface corresponding to a target icon in a case that the first pointer indicates the target icon, where the M application icons include the target icon. In this way, the time dial may be displayed, and display of the application interface may be triggered by a pointer on the time dial. The pointer may not be restricted by material quality and a force feedback relative to a physical button, but the pointer may be triggered to display M application icons associated with the pointer relative to an icon control. Therefore, the application interface that needs to be displayed is selected, and the pointer may not be restricted by scattered distribution of icon controls, thereby improving an effect of triggering display of the application interface.

In some embodiments, the processor 1310 is configured to adjust a display state of the first pointer to a first display state in response to the first input.

The display unit 1306 is further configured to display the M application icons associated with the first display state.

In some embodiments, the first display state of the first pointer includes at least one of the following.

a pointing location of the first pointer is a target location;
a length of the first pointer is a target length; and
a rotation angle of the first pointer is a target angle.

In some embodiments, the first display state is the target length or the target angle, and in a case that the first display state is the target length, the M application icons are any one of the following:

application icons corresponding to the first M applications arranged in ascending order of intervals from a current time in the most recently used applications, where M is determined based on the target length, and an application icon corresponding to an $N^{th}$ application arranged in ascending order of intervals from a current time in the most recently used applications, where N is determined based on the target length; and in a case that the first display state is the target angle, the M application icons are any one of the following:

application icons corresponding to the first M applications arranged in ascending order of intervals from a current time in the most recently used applications, where M is determined based on the target angle; and an application icon corresponding to an $N^{th}$ application arranged in ascending order of intervals from a current time in the most recently used applications, where N is determined based on the target angle.

In some embodiments, the display unit 1306 is further configured to:

display the application interface corresponding to the target icon in a case that a pointing location of the first pointer points to the target icon;
or
display the application interface corresponding to the target icon in a case that a rotation angle of the first pointer corresponds to the target icon;
or
display the application interface corresponding to the target icon in a case that a length of the first pointer corresponds to the target icon.

In some embodiments, M is greater than 1, and the processor 1310 is further configured to: in a case that a pointing direction of the first pointer displays a plurality of application icons in the M application icons, determine that an application icon displayed at the top in the pointing direction of the first pointer is the target icon pointed to by the pointing location of the first pointer.

In some embodiments, the processor 1310 is further configured to:

in a case that the first input does not instruct to rotate the first pointer, obtain the rotation angle of the first pointer in a first display state, where the first display state is a display state associated with the M application icons;
or
in a case that K is greater than 1, obtain the rotation angle of the first pointer relative to a second pointer in the K pointers;
or
in a case that the first input instructs to rotate the first pointer, obtain the rotation angle of the first pointer relative to an initial location, where the initial location is a location of the first pointer before the first input is received.

It should be understood that, in this embodiment of this application, the input unit 1304 may include a Graphics Processing Unit (GPU) 13041 and a microphone 13042, and the graphics processing unit 13041 processes image data of a still picture or a video obtained by an image capture apparatus (such as a camera) in a video capture mode or an image capture mode. The display unit 1306 may include a display panel 13061. In some embodiments, the display panel 13061 may be configured in a form such as a liquid crystal display or an organic light-emitting diode. The user input unit 1307 includes a touch panel 13071 and another input device 13072. The touch panel 13071 is also referred to as a touchscreen. The touch panel 13071 may include two parts: a touch detection apparatus and a touch controller. The another input device 13072 may include but is not limited to a physical keyboard, a functional button (such as a volume control button or a power on/off button), a trackball, a mouse, and a joystick. Details are not described herein. The memory 1309 may be configured to store a software program and various data, including but not limited to an application and an operating system. An application processor and a modem processor may be integrated into the processor 1310, the application processor mainly processes an operating system, a user interface, an application, and the like, and the modem processor mainly processes wireless communication. It can be understood that, in some alternative embodiments, the modem processor may not be integrated into the processor 1310.

An embodiment of this application further provides a readable storage medium. The readable storage medium stores a program or an instruction, and the program or the instruction is executed by a processor to implement the processes of the foregoing display method embodiment and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product is stored in a non-volatile storage medium, and the computer program product is executed by at least one processor to implement the processes of the foregoing display method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application entirely or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A display method, comprising:
   displaying a time dial comprising K pointers, wherein the K pointers are used to indicate time, and K is a positive integer;
   receiving a first input performed on a first pointer in the K pointers;
   displaying, in response to the first input, M application icons associated with the first pointer according to a first display state, wherein M is a positive integer; and
   displaying an application interface corresponding to a target icon when the first pointer indicates the target icon, wherein the M application icons comprise the target icon,
   wherein the first display state of the first pointer comprises at least one of the following:
   a pointing location of the first pointer being a target location;
   a length of the first pointer being a target length; or
   a rotation angle of the first pointer being a target angle,
   wherein when the first display state is the target length, the M application icons are any one of the following:
      application icons corresponding to the first M applications arranged in ascending order of intervals from a current time in the most recently used applications, wherein M is determined based on the target length; or
      an application icon corresponding to an $N^{th}$ application arranged in ascending order of intervals from a current time in the most recently used applications, wherein N is determined based on the target length; and
   wherein when the first display state is the target angle, the M application icons are any one of the following:
      application icons corresponding to the first M applications arranged in ascending order of intervals from a current time in the most recently used applications, wherein M is determined based on the target angle; or
      an application icon corresponding to an $N^{th}$ application arranged in ascending order of intervals from a current time in the most recently used applications, wherein N is determined based on the target angle.

2. The display method according to claim 1, wherein the displaying, in response to the first input, M application icons associated with the first pointer according to the first display state comprises:
adjusting a display state of the first pointer to the first display state in response to the first input; and
displaying the M application icons associated with the first display state.

3. The display method according to claim 1, wherein the displaying an application interface corresponding to a target icon when the first pointer indicates the target icon comprises:
displaying the application interface corresponding to the target icon when the pointing location of the first pointer points to the target icon;
or
displaying the application interface corresponding to the target icon when the rotation angle of the first pointer corresponds to the target icon;
or
displaying the application interface corresponding to the target icon when the length of the first pointer corresponds to the target icon.

4. The display method according to claim 3, wherein M is greater than 1, and before the displaying the application interface corresponding to the target icon when the pointing location of the first pointer points to the target icon, the method further comprises:
when the pointing direction of the first pointer displays a plurality of application icons in the M application icons, determining that an application icon displayed at the top in the pointing direction of the first pointer is the target icon pointed to by the pointing location of the first pointer.

5. The display method according to claim 3, wherein before the displaying the application interface corresponding to the target icon when the rotation angle of the first pointer corresponds to the target icon, the method further comprises:
when the first input does not instruct to rotate the first pointer, obtaining the rotation angle of the first pointer in the first display state, wherein the first display state is a display state associated with the M application icons;
or
when K is greater than 1, obtaining the rotation angle of the first pointer relative to a second pointer in the K pointers;
or
when the first input instructs to rotate the first pointer, obtaining the rotation angle of the first pointer relative to an initial location, wherein the initial location is a location of the first pointer before the first input is received.

6. An electronic device, comprising a processor; and a memory having a computer program or an instruction stored thereon, wherein the computer program or the instruction, when executed by the processor, causes the processor to implement operations comprising:
displaying a time dial comprising K pointers, wherein the K pointers are used to indicate time, and K is a positive integer;
receiving a first input performed on a first pointer in the K pointers;
displaying, in response to the first input, M application icons associated with the first pointer according to a first display state, wherein M is a positive integer; and
displaying an application interface corresponding to a target icon when the first pointer indicates the target icon, wherein the M application icons comprise the target icon,
wherein the first display state of the first pointer comprises at least one of the following:
a pointing location of the first pointer being a target location;
a length of the first pointer being a target length; or
a rotation angle of the first pointer being a target angle,
wherein when the first display state is the target length, the M application icons are any one of the following:
application icons corresponding to the first M applications arranged in ascending order of intervals from a current time in the most recently used applications, wherein M is determined based on the target length;
or
an application icon corresponding to an $N^{th}$ application arranged in ascending order of intervals from a current time in the most recently used applications, wherein N is determined based on the target length; and
wherein when the first display state is the target angle, the M application icons are any one of the following:
application icons corresponding to the first M applications arranged in ascending order of intervals from a current time in the most recently used applications, wherein M is determined based on the target angle;
or
an application icon corresponding to an $N^{th}$ application arranged in ascending order of intervals from a current time in the most recently used applications, wherein N is determined based on the target angle.

7. The electronic device according to claim 6, wherein the displaying, in response to the first input, M application icons associated with the first pointer according to the first display state comprises:
adjusting a display state of the first pointer to the first display state in response to the first input; and
displaying the M application icons associated with the first display state.

8. The electronic device according to claim 6, wherein the displaying an application interface corresponding to a target icon when the first pointer indicates the target icon comprises:
displaying the application interface corresponding to the target icon when the pointing location of the first pointer points to the target icon;
or
displaying the application interface corresponding to the target icon when the rotation angle of the first pointer corresponds to the target icon;
or
displaying the application interface corresponding to the target icon when the length of the first pointer corresponds to the target icon.

9. The electronic device according to claim 8, wherein M is greater than 1, and before the displaying the application interface corresponding to the target icon when the pointing location of the first pointer points to the target icon, the operations further comprise:
when the pointing direction of the first pointer displays a plurality of application icons in the M application icons, determining that an application icon displayed at the top in the pointing direction of the first pointer is the target icon pointed to by the pointing location of the first pointer.

10. The electronic device according to claim 8, wherein before the displaying the application interface corresponding to the target icon when the rotation angle of the first pointer corresponds to the target icon, the operations further comprise:
when the first input does not instruct to rotate the first pointer, obtaining the rotation angle of the first pointer in the first display state, wherein the first display state is a display state associated with the M application icons;
or
when K is greater than 1, obtaining the rotation angle of the first pointer relative to a second pointer in the K pointers;
or
when the first input instructs to rotate the first pointer, obtaining the rotation angle of the first pointer relative to an initial location, wherein the initial location is a location of the first pointer before the first input is received.

11. A non-transitory computer readable storage medium storing a computer program or an instruction that, when executed by a processor, causes the processor to implement operations comprising:
displaying a time dial comprising K pointers, wherein the K pointers are used to indicate time, and K is a positive integer;
receiving a first input performed on a first pointer in the K pointers;
displaying, in response to the first input, M application icons associated with the first pointer according to a first display state, wherein M is a positive integer; and
displaying an application interface corresponding to a target icon when the first pointer indicates the target icon, wherein the M application icons comprise the target icon,
wherein the first display state of the first pointer comprises at least one of the following:
a pointing location of the first pointer being a target location;
a length of the first pointer being a target length; or
a rotation angle of the first pointer being a target angle,
wherein when the first display state is the target length, the M application icons are any one of the following:
application icons corresponding to the first M applications arranged in ascending order of intervals from a current time in the most recently used applications, wherein M is determined based on the target length;
or
an application icon corresponding to an $N^{th}$ application arranged in ascending order of intervals from a current time in the most recently used applications, wherein N is determined based on the target length; and
wherein when the first display state is the target angle, the M application icons are any one of the following:
application icons corresponding to the first M applications arranged in ascending order of intervals from a current time in the most recently used applications, wherein M is determined based on the target angle;
or
an application icon corresponding to an $N^{th}$ application arranged in ascending order of intervals from a current time in the most recently used applications, wherein N is determined based on the target angle.

12. The non-transitory computer readable storage medium according to claim 11, wherein the displaying, in response to the first input, M application icons associated with the first pointer according to the first display state comprises:
adjusting a display state of the first pointer to the first display state in response to the first input; and
displaying the M application icons associated with the first display state.

13. The non-transitory computer readable storage medium according to claim 11, wherein the displaying an application interface corresponding to a target icon when the first pointer indicates the target icon comprises:
displaying the application interface corresponding to the target icon when the pointing location of the first pointer points to the target icon;
or
displaying the application interface corresponding to the target icon when the rotation angle of the first pointer corresponds to the target icon;
or
displaying the application interface corresponding to the target icon when the length of the first pointer corresponds to the target icon.

14. The non-transitory computer readable storage medium according to claim 13, wherein M is greater than 1, and before the displaying the application interface corresponding to the target icon when the pointing location of the first pointer points to the target icon, the operations further comprise:
when the pointing direction of the first pointer displays a plurality of application icons in the M application icons, determining that an application icon displayed at the top in the pointing direction of the first pointer is the target icon pointed to by the pointing location of the first pointer.

* * * * *